Oct. 14, 1952   L. L. JOHNSTON   2,613,410
MOLDING APPARATUS
Filed March 11, 1949   4 Sheets-Sheet 1

INVENTOR
Loyal L. Johnston
by his attorneys

Oct. 14, 1952 — L. L. JOHNSTON — 2,613,410

MOLDING APPARATUS

Filed March 11, 1949 — 4 Sheets-Sheet 2

INVENTOR
Loyal L. Johnston
by Hooper, Leonard & Glenn
his attorneys

Oct. 14, 1952　　　L. L. JOHNSTON　　　2,613,410
MOLDING APPARATUS
Filed March 11, 1949　　　　　　　　　　　4 Sheets-Sheet 3
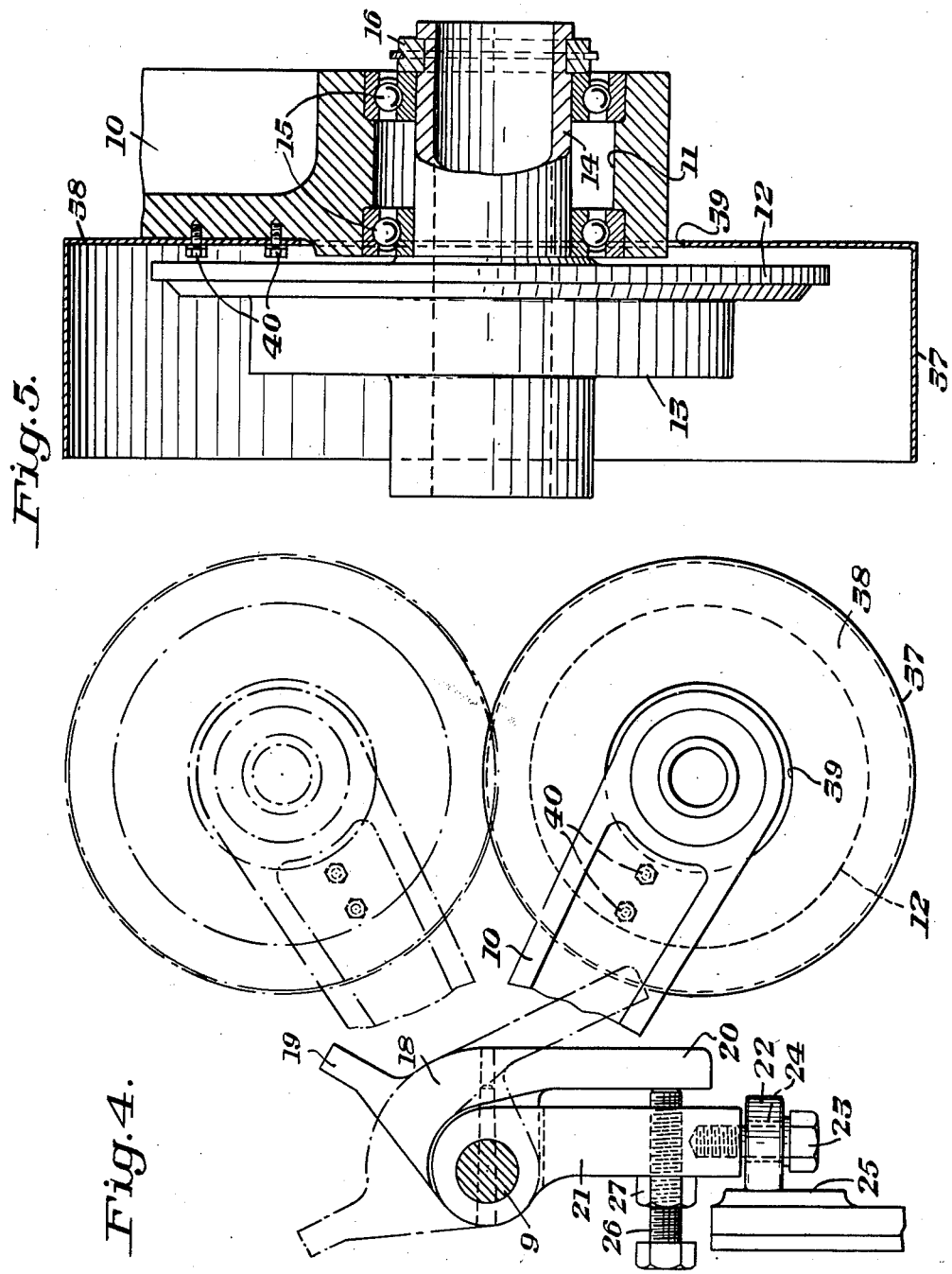
INVENTOR
Loyal L. Johnston Oct. 14, 1952 L. L. JOHNSTON 2,613,410
MOLDING APPARATUS
Filed March 11, 1949 4 Sheets-Sheet 4

INVENTOR
Loyal L. Johnston
his attorneys

Patented Oct. 14, 1952

2,613,410

UNITED STATES PATENT OFFICE 2,613,410

MOLDING APPARATUS

Loyal L. Johnston, Zelienople, Pa., assignor to Herman Pneumatic Machine Company, Pittsburgh, Pa., a corporation of Pennsylvania Application March 11, 1949, Serial No. 80,847

7 Claims. (Cl. 22—37)

This invention relates to molding apparatus, specifically molding apparatus employing a removable core. The invention has to do with mechanism whereby a core may be moved into and out of cooperative relationship with a mold and when in cooperative relationship with the mold maintained in place while the mold is used for molding of a product therein.

While my invention is one of the wide adaptability I have found it especially useful in molding apparatus for us in centrifugal casting. In such apparatus a core is provided which is movable into and out of cooperative relationship with the mold and which when in cooperative relationship with the mold spins with the mold as a unit during the centrifugal casting of a product in the mold. Such apparatus may be used for centrifugal casting bell end pipe, the body of the pipe being centrifugally cast within the mold proper and the bell being centrifugally cast between the end portion of the mold proper and the core.

My invention is adaptable to apparatus of the type shown in my Patent No. 2,449,900. That patent discloses a flask in which a mold of mold forming material such as sand, graphite or a mixture thereof is formed, the flask being spun to centrifugally cast a pipe section in the mold. A core is provided which is applied to the end of the mold where the bell end of the pipe is to be formed. I provide mechanism including a core holder on which the core is mounted and means of moving the core holder to position the core in cooperative relationship with the mold formed in the flask and to remove the core therefrom and render the mold or flask accessible generally axially thereof. I show mechanism including a plurality of flasks or molds with a core for each and means for manipulating the cores simultaneously. My invention in its broader aspects has to do with a single core holder and the means for manipulating it while in its more specific aspects it has to do with a plurality of core holders and the manipulating mechanism therefor.

Since in the present case I am concerned with the core, the core holder which carries it and the means for manipulating the same, I shall confine the specific description to those elements and shall refer to the flask and/or mold proper therein by the generic term "mold." The mold may be a compacted mold of mold forming material such as sand, graphite or the like or it may be a metal or so called "chill" mold. The core may likewise be formed of any material suitable for the particular purpose at hand. For the centrifugal casting of soil pipe I prefer to use a sand mold compacted within a flask and a sand core cooperating therewith.

I provide molding apparatus comprising a mold, a core holder, means for supporting the core holder for movement into and out of cooperative relationship with the mold and means cooperating with the first mentioned means for shifting the core holder transversely of the direction of the first mentioned movement when the core holder is out of cooperative relationship with the mold to render the mold accessible from said direction. It is important to render the mold accessible, i. e., free from any impediment, axially at the end thereof at which the core is positioned because it is desirable to discharge bell end pipe formed therein through the end of the mold at which the bell is formed and hence through the end of the mold at which the core is positioned. I provide for moving the core into and out of cooperative relationship with the mold and when it is out of cooperative relationship with the mold moving it transversely of the mold axis to clear the mold in the axial direction. The core holder is mounted for rotation on the means carrying it so that when it is in cooperative relationship with the mold for the centrifugal casting of a pipe section and the mold is spun the core and core holder spin with it.

I further provide molding apparatus comprising a mold, a core holder, means for supporting the core holder for movement into and out of cooperative relationship with the mold and means engageable with the first mentioned means only when the core holder is out of cooperative relationship with the mold to shift the core holder transversely of the direction of the first mentioned movement to render the mold accessible from said direction. I also provide molding apparatus comprising a mold, a supporting member which is bodily displaceable and also turnable generally about an axis parallel to the direction in which it is bodily displaceable, a core holder carried by the supporting member and movable into and out of cooperative relationship with the mold upon bodily displacement of the supporting member and means for turning the supporting member when the core holder is out of cooperative relationship with the mold to shift the core holder transversely of the direction of movement of the core holder into and out of cooperative relationship with the mold to render the mold accessible from said direction.

Desirably I provide a detent projecting from the supporting member and means engageable with the detent when the core is out of cooperative relationship with the mold to turn the supporting member and thereby shift the core holder transversely of the direction of movement of the core holder into and out of cooperative relationship with the mold to render the mold accessible from said direction.

I provide means maintaining the core holder in predetermined alignment with the mold during movement of the core holder into and out of cooperative relationship with the mold. Such means may include a bearing member connected with the means for supporting the core holder and riding along a stationary portion of the apparatus during movement of the core holder into and out of cooperative relationship with the mold maintaining the core holder in alignment.

I still further provide molding apparatus comprising a plurality of molds arranged in side-by-side relationship, a core holder for each mold, means for supporting the core holders for movement into and out of cooperative relationship with the respective molds and means cooperating with the first mentioned means for shifting the core holders transversely of the direction of said first mentioned movement when the core holders are out of cooperative relationship with the molds to render the molds accessible from said direction.

I also provide molding apparatus comprising a mold, mounting means carrying the mold, means connected with the mounting means moving the mounting means between a position in which the axis of the mold is generally horizontal and a position in which the axis of the mold is relatively upright to adapt it to receive mold forming material introduced generally downwardly thereinto, a member applicable to the end of the mold which is the lower end when the mold is positioned with its axis relatively upright, such member being shaped so that when it is applied to said end of the mold it at least partially closes said end of the mold to prevent mold forming material introduced generally downwardly into the mold from passing out of the lower end of the mold and means connected with the mold and with said member supporting said member and movable to remove said member from said end of the mold. The member applicable to the end of the mold which is the lower end when the mold is positioned with its axis relatively upright preferably has means receiving a core applicable to said end of the mold when said member is applied to said end of the mold. Means connected with the mold are preferably provided which rotate the mold about its axis when it is positioned with its axis generally horizontal and the member applicable to the end of the mold which is the lower end when the mold is positioned with its axis relatively upright is preferably supported for rotation with the mold when said member is applied to said end of the mold.

Other details, objects and advantages of the invention will become apparent as the following description of a present preferred embodiment thereof proceeds.

In the accompanying drawings I have shown a present preferred embodiment of the invention, in which Figure 1 is an end elevational view of molding apparatus which comprises four molds arranged in side-by-side relationship with cores disposed in cooperative relationship with the molds, one of the cores also being shown in chain lines as having been moved out of cooperative relationship with its mold and transversely to render the mold axially accessible;

Figure 4 is a fragmentary detail view showing the means for maintaining a core holder in predetermined alignment with its mold during movement of the core holder into and out of cooperative relationship with the mold;

Figure 5 is a fragmentary detail view partly in cross section showing the mounting for a core holder.

Figure 1:
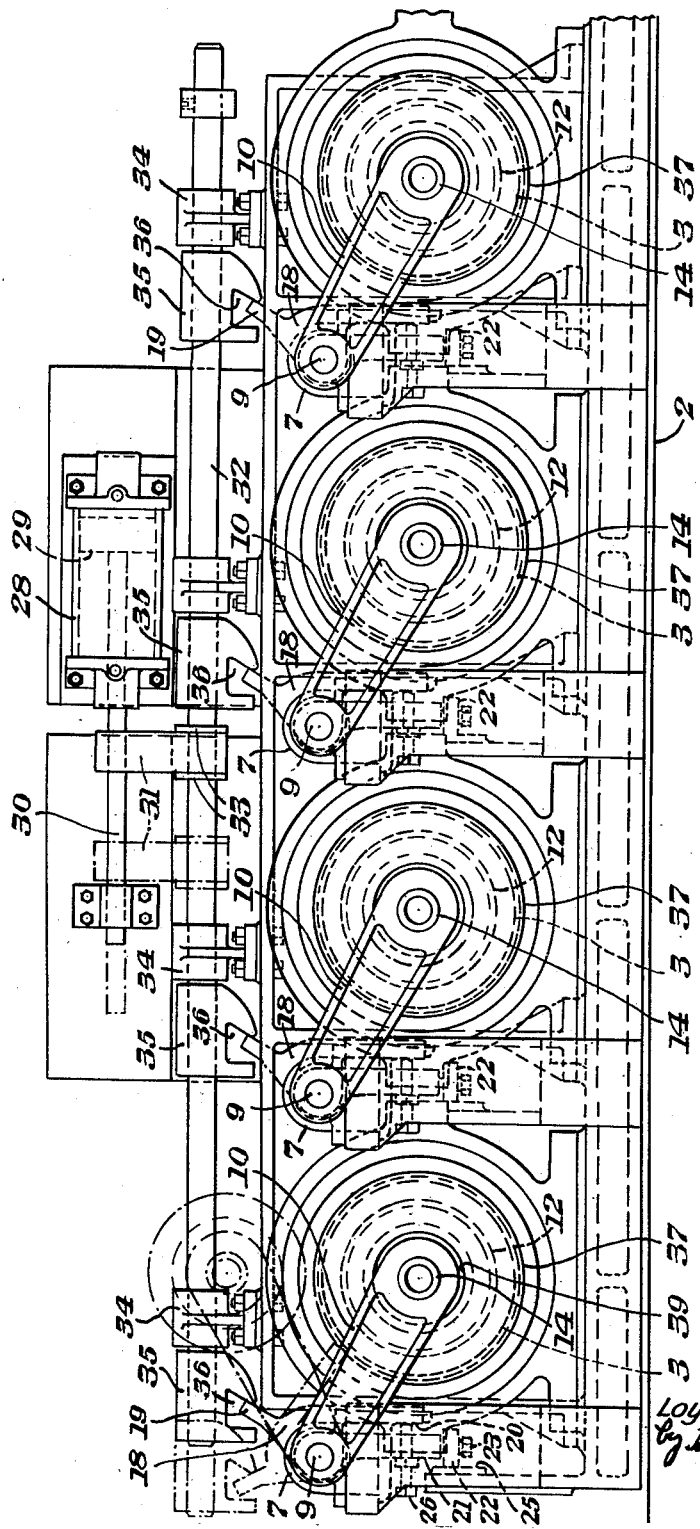

Referring now more particularly to the drawings, there is provided a support designated generally by reference numeral 2 in which four molds 3 are rotatively mounted. Each mold 3 in the form of structure shown comprises a steel flask 4 in which is compacted a mold 5 of mold forming material such, for example, as sand. The apparatus may be considered as being of the same general type as that of my Patent No. 2,449,900 except that in the present case I show four molds disposed in side-by-side relationship whereas my patent shows only one mold. The support 2 may be and preferably is mounted for tilting movement so that all four of the molds may be moved together as a unit between a position in which their axes are generally horizontal and a position in which their axes are generally vertical.

Figure 2:
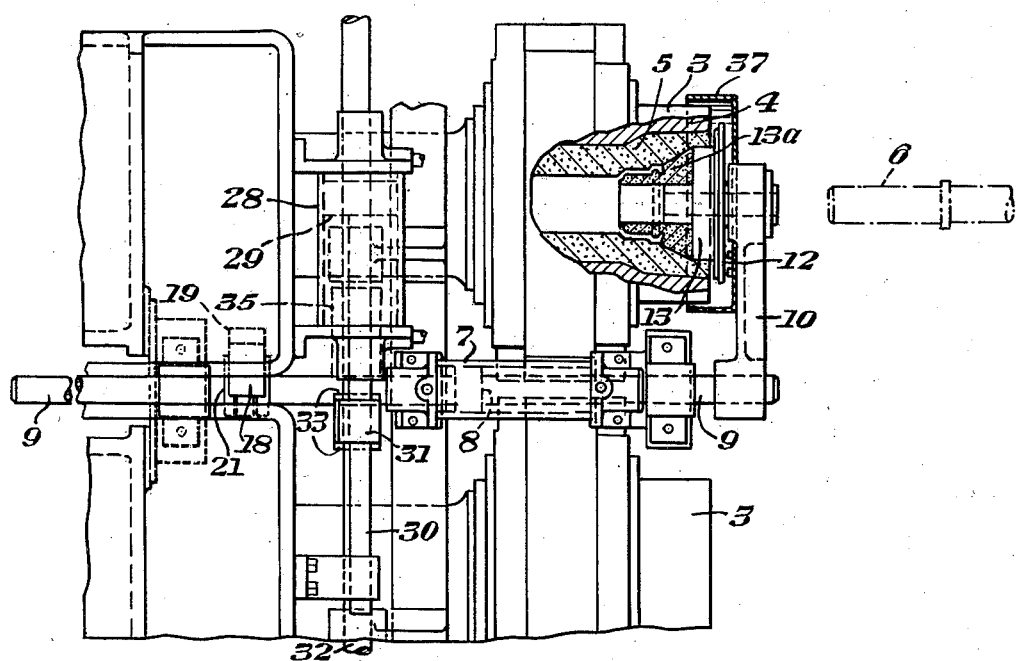
Figure 2 is a fragmentary plan view of the mechanism shown in Figure 1 with a portion in cross section.

As explained in my said patent, the mold forming material may be introduced when the molds are in upright position and the molds may be rotated to cause the mold forming material to adhere to the inner walls of the flasks whereupon the mold forming material may be shaped and compacted as by use of mandrels as indicated in chain lines at 6 in Figure 2. During the formation of the molds 5 the cores, presently to be described, are disposed out of cooperative relationship with the molds so that the molds are accessible axially. After formation of centrifugally cast products in the molds the support 2 may again be turned to position with the mold axes generally vertical for discharge of the cast pipe sections therefrom. Desirably the pipe sections are discharged through the ends of the molds at which the pipe bells were formed so that at the time of discharge the cores must be moved out of cooperative relationship with the molds and positioned so as to render the molds accessible axially.

The support carries adjacent each mold a cylinder 7 within which operates a piston 8 having a piston rod or shaft 9 which projects from both ends of the cylinder. Since the structure of all four mold units is the same a description of one will suffice for all. At the forward end of the piston rod 9 there is fixed to the rod an arm 10. The outer end of the arm 10 is formed with a cylindrical opening 11 therethrough. There is provided a core holder designated generally by reference numeral 12 and comprising a portion 13 to which a core (designated 13a in Figure 2) is adapted to be fitted and a hollow stem 14 passing through the cylindrical opening 11. Bearings 15 are disposed between the inner surface of the opening 11 and the stem 14, the core holder being maintained in place by a split ring 16. Thus the core holder is freely rotatively mounted in the end of the arm 10 which, in turn, is fixed to the forward end of the piston rod 9.

The piston rod 9 is not only movable axially upon movement of the piston 8 in the cylinder 7 but is also turnable about its axis. The length of the arm 10 is such that when the piston rod 9 is in one rotative position the core holder 12 is coaxial with the corresponding mold. The piston rod 9 may be turned to move the core holder transversely of the axis of the mold so as to render the mold axially accessible. In Figure 1 the four core holders are shown in solid lines as being in cooperative relationship with the molds (as is also the case in Figure 2 and in solid lines in Figure 3) but the core for the left-hand mold in Figure 1 is shown in chain lines as having been moved transversely of the axis of the mold and generally upwardly out of cooperative relationship with the mold to render the mold axially accessible.

The axial movement of the piston rods or shafts 9 which carry the arms 10 is effected by the admission of fluid under pressure into the cylinders 7. I have not shown the fluid pressure system as that may be conventional once the general nature of the mechanism is ascertained. Preferably the fluid connections to the four cylinders 7 and the fluid control mechanism are so arranged that the four rods 9 partake of axial movement synchronously or as a group; this is desirably effected through operation of a single master control member.

Pinned to each rod 9 by a pin 17 is a member 18 in the nature of a double armed lever having a generally upwardly projecting short arm or detent 19 and a generally downwardly projecting longer arm 20. Loosely mounted upon each rod 9 but straddling the member 18 is a guide member 21 which hangs down in a generally vertical position and has a roller 22 fastened to its bottom by a screw 23, the roller 22 being rotatable upon a bushing 24. Upon axial movement of the rod 9 the roller 22 is adapted to bear against and ride along a straight stationary portion 25 of the apparatus, the portion 25 being desirably formed on the support 2. An adjustable stop screw 26 is threaded through the member 21 and is maintained in adjusted position by a lock nut 27. The nose of the stop screw 26 cooperates with the arm 20 in a manner which will presently be described.

Mounted on the support with its axis in a plane at right angles to the axes of the rods 9 and of the molds is a cylinder 28 in which operates a piston 29 having a piston rod 30 to which is fixed an arm 31. The outer end of the arm 31 receives through an opening therein a rod 32. The rod 32 has fastened thereto at opposite faces of the arm 31 stop members 33 so that upon movement of the arm 31 parallel to the axis of the rod 32 the rod is constrained to move with the arm. Thus, when fluid under pressure in the cylinder 28 moves the piston 29 axially of the cylinder the rod 30 and the arm 31 partake of movement synchronously therewith and by reason of the connection between the arm 31 and the rod 32 the latter is also constrained to move with the rod 30.

Figure 3:
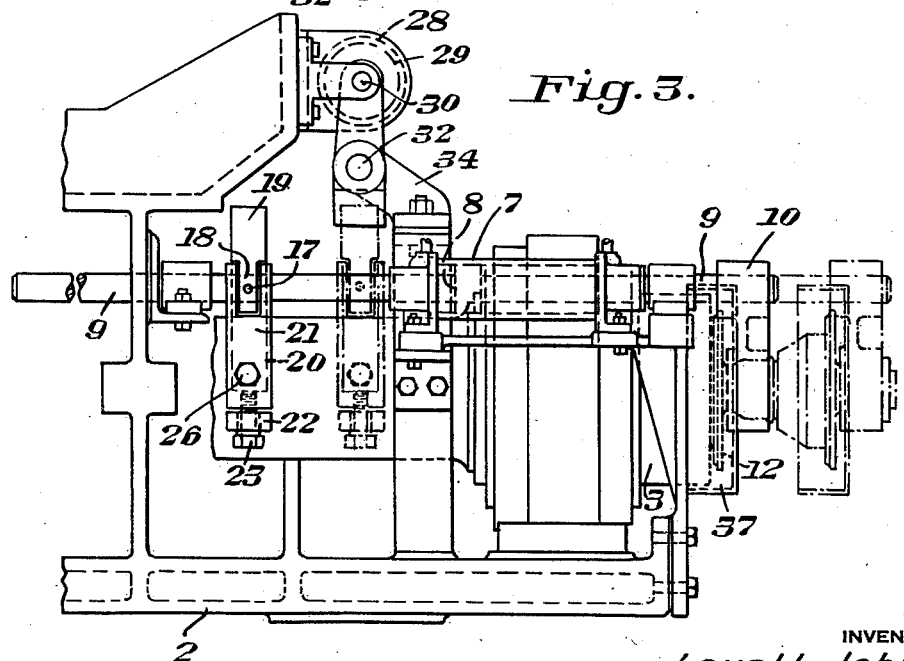
Figure 3 is a fragmentary side elevational view of the apparatus.

The rod 32 is mounted in bearings 34 carried by the support. Fastened to the rod 32 at intervals therealong are operating members 35 each having an opening 36 in its bottom surface. When the rods 9 are moved out to the positions in which the cores are in chain line position of Figure 3 the detents 19 enter the openings 36 in the operating members 35 but when the cores are in cooperative relationship with the molds the detents 19 are spaced from the operating members 35 axially of the rods 9 as shown in Figure 3 in which a detent 19 is shown in solid lines in the position which it occupies when its core is in cooperative relationship with the mold and in chain lines in the position it occupies when its core has been moved axially out of cooperative relationship with the mold. When the detents 19 are positioned in the openings 36 and fluid is admitted to the right of the piston 29 in the cylinder 28 the rod 32 is moved to the left viewing Figure 1 and the rods 9 are turned to lift the cores to the chain line position shown at the left in Figure 1 and thus render the molds axially accessible.

I preferably provide a safety device in the form of a metal guard which functions in the event of rupture of a core during the centrifugal casting operation. If a core ruptures during the centrifugal casting operation, molten metal issues from the end of the flask at which the core is positioned. Due to the fact that the flask is rotating at centrifugal speed the molten metal thus issuing is thrown out from the end of the flask with great force. Such throwing out of molten metal is a grave hazard to workmen. To eliminate the hazard I desirably provide a metal guard in the form of a generally cylindrical metal shell 37 which has at one end a radial flange portion 38 having therein a circular hole 39. The member 37 is adapted to be applied and bolted to the arm 10 by bolts 40 as shown in Figures 4 and 5 and has its generally cylindrical wall portion extending toward the flask. The diameter of the member 37 is greater than the outside diameter of the flask at the end at which the member 37 is positioned so that the flask end extends into the member 37 when the core holder is in operative position. Thus, if molten metal should issue from the end of the flask during the centrifugal casting operation that metal will strike against the member 37 and will not fly out so as to endanger workmen operating the centrifugal casting apparatus.

I shall describe a cycle of operation of my apparatus. The flasks are first moved to position in which their axes are generally upright, the core holders being disposed in operative position to close the lower ends of the flasks but without having cores on them. Molding material is introduced into the flasks through the upper ends thereof and is maintained in the flasks by the core holders closing the lower ends thereof. The flasks are turned down to generally horizontal position and rotated at sufficient speed to cause the mold forming material to dispose itself by centrifugal action against the inside walls of the flasks, the centrifugal action forming axial openings in the mold forming material. During such centrifugal action the core holders remain in place and prevent molding material from being ejected from the ends of the flasks which are closed by the core holders. After the axial openings have been formed in the mold forming material as above described the core holders are withdrawn axially away from the ends of the flasks and then swung transversely to positions clear of the flasks as above described whereupon the mandrels are introduced through the axial openings. At that time the rotative speed of the flasks may be reduced as centrifugal speed is not necessary during the operation of the mandrels to compact the mold forming material. The mandrels after having been introduced as above mentioned are moved transversely of the axes of the flasks to form and compact the mold forming material to form hollow molds for the centrifugal casting of elongated generally cylindrical articles. After the core holders have been moved to inoperative position to provide for insertion of the mandrels cores may be positioned on the core holders in readiness for application to the molds.

When the molds 5 are being formed the cores are in the inoperative projected and raised position shown in chain lines in Figure 1, i. e., the detents 19 are in the openings 36 of the operating members 35 fastened to the rod 32 and the rod 32 has been moved to the left by admission of fluid under pressure to the right of the piston 29 in the cylinder 28. At this time the pistons 8 in the cylinders 9 are in their extreme advanced or right-hand positions viewing Figure 3. When the operator is ready to position the cores in the ends of the molds he releases the fluid pressure from the right-hand side of the piston 29 in the cylinder 28. This permits the cores to move downwardly by gravity, turning the rods 9 in the clockwise direction viewing Figure 1. The members 21 are loose on the rods 9 with the rollers 22 disposed against the fixed portion 25 of the apparatus which serves as a guide. Turning of the rods 9 in the clockwise direction viewing Figure 1 is limited by engagement of the arms 20 with the noses of the stop screws 26. The stop screws are adjusted to bring the rods 9 to a stop when the cores are coaxial with the molds. This is the position of the cores shown in chain lines in Figure 3. Then fluid is admitted to the right of the pistons 8 in the cylinders 7 and the cores are moved into cooperative relationship with the molds as shown in Figure 2 during movement of the rods 9 in the axial direction. The cores are maintained coaxial with the molds by the rollers 22 rolling along the guideways 25 with the arms 20 in engagement with the noses of the stop screws 26 carried by the members 21. The cores are maintained in cooperative relationship with the molds until the centrifugal casting operation has been completed. During centrifugal casting the cores turn with the molds upon the bearings 15. During the centrifugal casting operation gases may vent through the hollow stem 14.

When the operator desires to move the cores out of cooperative relationship with the molds and render the molds axially accessible he releases fluid from the right-hand sides of the pistons 8 in the cylinders 7 viewing Figure 3 and admits fluid to the left-hand sides of those pistons, moving the rods 9 so that the cores and the detents 19 are positioned in the chain line positions of Figure 3. When thus positioned the detents 19 are disposed in the openings 36. Fluid is then admitted to the right of the piston 29 in the cylinder 28 and the rod 32 is moved to the left viewing Figure 1, raising all of the cores to the position indicated in chain lines at the left in Figure 1.

Figure 6:
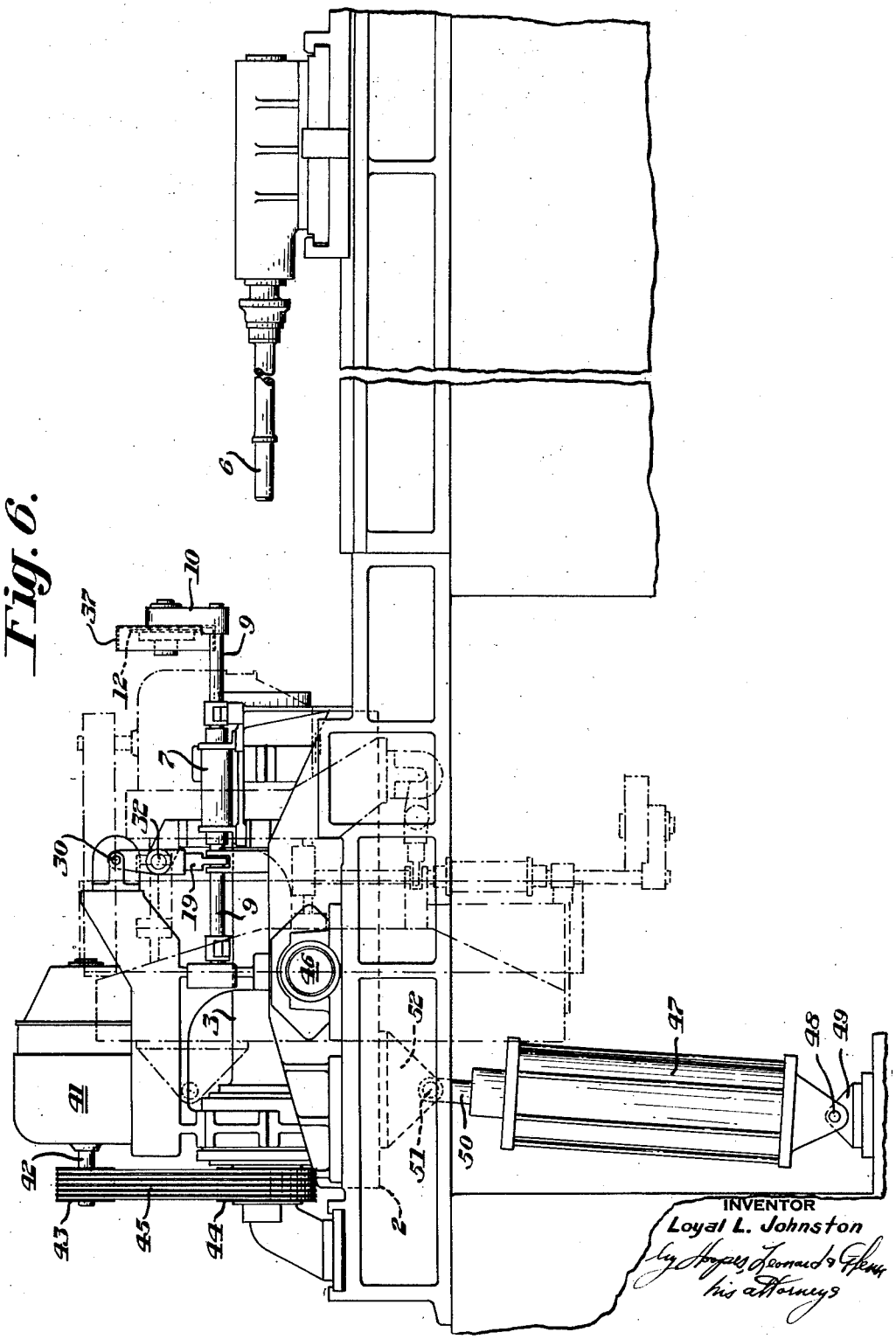
Figure 6 is an elevational view showing the apparatus in solid lines in position with the mold axes generally horizontal and in chain lines in position with the mold axes relatively upright.

Figure 6 is an elevational view showing the apparatus in solid lines in position with the mold axes generally horizontal and in chain lines in position with the mold axes relatively upright.

Each mold or flask 3 is adapted to be rotated by an electric motor 41 whose shaft 42 carries a multiple pulley 43. Each mold 3 also carries a multiple pulley 44 transversely aligned with the pulley 43 and belts 45, for example V-belts, are trained about the pulleys 43 and 44 so that when the motor 41 is operated the mold 3 is rotated about its axis.

The support 2 is mounted for bodily turning movement in a generally vertical plane about the axis of trunnion 46. Since the molds 3 and the motors 41 and the other mechanism above described, except the mandrels 6, are mounted on the support 2 they bodily move with the support. Turning of the support 2 about the axis of the trunnion 46 is effected by movement of a piston in a cylinder 47, the piston being moved by any suitable fluid. The cylinder 47 is pivoted at 48 to a stationary bracket 49. The piston rod 50 is pivoted at 51 to a bracket 52 connected with and in effect forming a part of the support 2. In the solid line position of Figure 6 the piston in the cylinder 47 is at the bottom of its stroke. When the piston is moved upwardly the support 2 and the mechanism carried thereby are turned in the clockwise direction about the axis of the trunnion 46 viewing Figure 6. When the piston in the cylinder 47 reaches the top of its stroke the molds 3 attain the chain line position of Figure 6 in which their axes are relatively upright.

While I have shown and described a present preferred embodiment of the invention it is to be distinctly understood that the invention is not limited thereto but may be otherwise variously embodied within the scope of the following claims.

I claim:

1. Molding apparatus comprising a mold, a supporting member which is bodily displaceable and also turnable generally about an axis parallel to the direction in which it is bodily displaceable, a core holder carried by the supporting member and movable into and out of cooperative relationship with the mold upon bodily displacement of the supporting member, a detent projecting from the supporting member and an operating member movable transversely of the direction of bodily displacement of the supporting member and having a portion with which the detent comes into alignment in the direction of movement of the operating member when the core holder is out of cooperative relationship with the mold, said portion being adapted upon movement of the operating member to engage and move the detent to turn the supporting member and thereby shift the core holder transversely of the direction of movement of the core holder into and out of cooperative relationship with the mold to render the mold accessible from said direction.

2. Molding apparatus comprising a mold, a shaft which is axially displaceable and also turnable generally about its axis, an arm fixed to the shaft, a core holder carried by the arm and movable into and out of cooperative relationship with the mold upon axial displacement of the shaft, means for turning the shaft when the core holder is out of cooperative relationship with the mold to swing the core holder transversely of the direction of movement of the core holder into and out of cooperative relationship with the mold to render the mold accessible from said direction, a bearing member mounted loosely on the shaft so that the shaft is turnable relatively thereto but maintained in fixed position axially of the shaft, the bearing member riding along and bearing against a stationary portion of the apparatus during movement of the core holder into and out of cooperative relationship with the mold, and a member fixed to the shaft having limiting engagement with the bearing member to maintain the core holder in predetermined alignment with the mold.

3. Molding apparatus comprising a mold, mounting means carrying the mold, means connected with the mounting means moving the mounting means between a position in which the axis of the mold is generally horizontal and a position in which the axis of the mold is relatively upright to adapt it to receive mold forming material introduced generally downwardly thereinto, a member applicable to the end of the mold which is the lower end when the mold is positioned with its axis relatively upright, such member being shaped so that when it is applied to said end of the mold it at least partially closes said end of the mold to prevent mold forming material introduced generally downwardly into the mold from passing out of the lower end of the mold and means connected with the mold and with said member supporting said member and movable to remove said member from said end of the mold.

4. Molding apparatus comprising a mold, mounting means carrying the mold, means connected with the mounting means moving the mounting means between a position in which the axis of the mold is generally horizontal and a position in which the axis of the mold is relatively upright to adapt it to receive mold forming material introduced generally downwardly thereinto, a member applicable to the end of the mold which is the lower end when the mold is positioned with its axis relatively upright, such member being shaped so that when it is applied to said end of the mold it at least partially closes said end of the mold to prevent mold forming material introduced generally downwardly into the mold from passing out of the lower end of the mold and means connected with the mold and with said member supporting said member and movable to remove said member from said end of the mold, said member having means receiving a core applicable to said end of the mold when said member is applied to said end of the mold.

5. Molding apparatus comprising a mold, mounting means carrying the mold, means connected with the mounting means moving the mounting means between a position in which the axis of the mold is generally horizontal and a position in which the axis of the mold is relatively upright to adapt it to receive mold forming material introduced generally downwardly thereinto, means connected with the mold rotating the mold about its axis when it is positioned with its axis generally horizontal, a member applicable to the end of the mold which is the lower end when the mold is positioned with its axis relatively upright, such member being shaped so that when it is applied to said end of the mold it at least partially closes said end of the mold to prevent mold forming material introduced generally downwardly into the mold from passing out of the lower end of the mold and means connected with the mold and with said member supporting said member for rotation with the mold when said member is applied to said end of the mold and movable to remove said member from said end of the mold.

6. Molding apparatus comprising an elongated mold having an open end, mounting means carrying the mold, a core holder adapted for application to the open end of the mold and when so applied to operatively position relatively to the mold a core held thereby, means connected with the mounting means and the core holder supporting the core holder non-coaxially with respect to the mold, means shifting the supporting means to move the core holder from the first mentioned position to a position in which it is supported coaxially of the mold, means maintaining the core holder spaced from the mold while being so moved and means for moving the core holder axially of the mold into cooperative relationship with the open end thereof, said last mentioned means tightly pressing against the mold the core held by the core holder.

7. Molding apparatus comprising mounting means, an elongated mold having an open end rotatably mounted in the mounting means, a member adapted for application to the open end of the mold, means connected with the mounting means and the member supporting the member non-coaxially with respect to the mold, the member being rotatably mounted in the supporting means, means shifting the supporting means to move the member from the first mentioned position to a position in which it is supported coaxially of the mold, means maintaining the member spaced from the mold while being so moved and means for moving the member axially of the mold into cooperative relationship with the open end thereof, said last mentioned means tightly pressing the member against the mold.

LOYAL L. JOHNSTON.

REFERENCES CITED

The following references are of record in the file of this patent:

UNITED STATES PATENTS

| Number | Name | Date |
| --- | --- | --- |
| 1,301,373 | Bruner et al. | Apr. 22, 1919 |
| 1,307,823 | Ladd | June 24, 1919 |
| 1,450,892 | MacNeill | Apr. 3, 1923 |
| 1,475,017 | Jones | Nov. 20, 1923 |
| 1,485,860 | Ladd | Mar. 4, 1924 |
| 1,567,488 | Burchartz | Dec. 29, 1925 |
| 1,735,969 | Hurst | Nov. 19, 1929 |
| 1,942,919 | Eurich et al. | Jan. 9, 1934 |
| 2,023,562 | Williams | Dec. 10, 1935 |
| 2,030,105 | Eurich et al. | Feb. 11, 1936 |
| 2,047,588 | Ledeboer | July 14, 1936 |
| 2,172,798 | Littmann | Sept. 12, 1939 |
| 2,340,262 | Crawford | Jan. 25, 1944 |
| 2,449,900 | Johnston | Sept. 21, 1948 |
| 2,480,284 | Boucher | Aug. 30, 1949 |

FOREIGN PATENTS

| Number | Country | Date |
| --- | --- | --- |
| 13,725 | Great Britain | 1891 |